(12) United States Patent
Gigi

(10) Patent No.: US 7,050,967 B2
(45) Date of Patent: May 23, 2006

(54) SPEECH CODING SYSTEM

(75) Inventor: Ercan Ferit Gigi, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 696 days.

(21) Appl. No.: 10/116,550

(22) Filed: Apr. 4, 2002

(65) Prior Publication Data

US 2002/0184005 A1 Dec. 5, 2002

(30) Foreign Application Priority Data

Apr. 9, 2001 (EP) ................................. 01201300

(51) Int. Cl.
G10L 11/04 (2006.01)
G10L 19/02 (2006.01)

(52) U.S. Cl. .................................... 704/206; 704/229

(58) Field of Classification Search ................ 704/203, 704/200.1, 205, 212, 216, 219, 223, 224, 704/226, 227, 234, 265, 200, 759
See application file for complete search history.

(56) References Cited

U.S. PATENT DOCUMENTS

| | | | | |
|---|---|---|---|---|
| 4,285,045 A | * | 8/1981 | Tamori et al. | 708/300 |
| 4,476,539 A | * | 10/1984 | Tamori et al. | 708/819 |
| 4,856,026 A | * | 8/1989 | Bergmans et al. | 375/285 |
| 5,231,484 A | * | 7/1993 | Gonzales et al. | 375/240.04 |
| 5,511,095 A | * | 4/1996 | Inoue et al. | 375/244 |
| 5,754,974 A | * | 5/1998 | Griffin et al. | 704/206 |
| 5,978,762 A | * | 11/1999 | Smyth et al. | 704/229 |
| 6,487,535 B1 | * | 11/2002 | Smyth et al. | 704/500 |
| 2002/0007273 A1 | * | 1/2002 | Chen | 704/229 |

OTHER PUBLICATIONS

D L. Lee et al., Voice response systems, Dec. 1983, ACM Computing Surveys (CSUR), vol. 15 Issue 4, pp. 351-374.*
Painter T. et al., A Review of Algorithms for Perceptual Coding of Digital Audio Signals, Jul. 1997,DSP Proceedings, vol. 1, pp. 179-208.*
Lefebvre, R. et al., Spectral amplitude warping (SAW) for noise spectrum shaping in audio coding, Apr. 21-24, 1997, ICASSP-97, vol. 1, pp. 335-338.*
Dialogic ADPCM Algorithm, 1988, Dialogic Corporation 00-1366-001, pp. 1-7.*
Deller J.R. et al., Discrete-Time Processing of Speech Signals, 1993, Prentice-Hall, pp. 442-443.*

* cited by examiner

Primary Examiner—Richemond Dorvil
Assistant Examiner—Myriam Pierre
(74) Attorney, Agent, or Firm—Michael J. Ure

(57) ABSTRACT

In a speech coding system with an encoder and a decoder cooperating with said encoder, the speech encoder comprises a pre-processor and an ADPCM encoder with a quantizer and step-size adaptation means, while the speech decoder comprises an ADPCM decoder with similar step-size adaptation means as in the ADPCM encoder and with a decoder, and a post-processor. The quantizer is provided with storage means containing values for a correction factor $\alpha(c(n))$ of the step-size $\Delta(n)$, said correction factor being dependent on the quantizer output signal $c(n)$. The step-size adaptation occurs in accordance with the relation:

$$\Delta(n+1) = \Delta(n) \cdot A \cdot \begin{cases} \alpha(c(n)) & \text{if } \alpha(c(n)) < 1 \\ \alpha(c(n)) + b & \text{if } \Delta(n) \cdot A \cdot c_{max} < \Delta_{max} \\ 1 & \text{otherwise} \end{cases}$$

3 Claims, 7 Drawing Sheets

| Index $c(n)$ | Quant. level $e(n) / \Delta(n)$ | Scale factor $\alpha(c(n))$ |
|---|---|---|
| 0 | $-\infty \leq q < -0.5$ | 1.0625 |
| 1 | $-0.5 \leq q < 0.5$ | 0.9375 |
| 2 | $0.5 \leq q < \infty$ | 1.0625 |

FIG. 2A

| Index $c(n)$ | Quant. level $e(n)/\Delta(n)$ | Scale factor $\alpha(c(n))$ |
|---|---|---|
| 0 | $-\infty \le q < -0.5$ | 1.125 |
| 1 | $-0.5 \le q < 0.5$ | 1.000 |
| 2 | $0.5 \le q < \infty$ | 1.125 |

FIG. 2B

| Index $c(n)$ | Quant. level $e(n)/\Delta(n)$ | Scale factor $\alpha(c(n))$ |
|---|---|---|
| 0 | $-\infty \le q < -1$ | 1.25 |
| 1 | $-1 \le q < 0$ | 1.00 |
| 2 | $0 \le q < 1$ | 1.00 |
| 3 | $1 \le q < \infty$ | 1.25 |

| Index $c(n)$ | Quant. level $e(n)/\Delta(n)$ | Scale factor $\alpha(c(n))$ |
|---|---|---|
| 0 | $-\infty \le q < -2.0$ | 1.2500 |
| 1 | $-2.0 \le q < -1.0$ | 1.0625 |
| 2 | $-1.0 \le q < 0.0$ | 1.0000 |
| 3 | $0.0 \le q < 1.0$ | 1.0000 |
| 4 | $1.0 \le q < 2.0$ | 1.0625 |
| 5 | $2.0 \le q < \infty$ | 1.2500 |

FIG. 2D

| Index $c(n)$ | Quant. level $e(n)/\Delta(n)$ | Scale factor $\alpha(c(n))$ |
|---|---|---|
| 0 | $-\infty \le q < -1.5$ | 1.2500 |
| 1 | $-1.5 \le q < -0.5$ | 1.0625 |
| 2 | $-0.5 \le q < 0.5$ | 1.0000 |
| 3 | $0.5 \le q < 1.5$ | 1.0625 |
| 4 | $1.5 \le q < \infty$ | 1.2500 |

FIG. 2C

| Index $c(n)$ | Quant. level $e(n)/\Delta(n)$ | Scale factor $a(c(n))$ |
|---|---|---|
| 0 | $-\infty \leq q < -7.0$ | 2.000 |
| 1 | $-7.0 \leq q < -6.0$ | 1.500 |
| 2 | $-6.0 \leq q < -5.0$ | 1.250 |
| 3 | $-5.0 \leq q < -4.0$ | 1.125 |
| 4 | $-4.0 \leq q < -3.0$ | 1.000 |
| 5 | $-3.0 \leq q < -2.0$ | 1.000 |
| 6 | $-2.0 \leq q < -1.0$ | 1.000 |
| 7 | $-1.0 \leq q < 0.0$ | 1.000 |
| 8 | $0.0 \leq q < 1.0$ | 1.000 |
| 9 | $1.0 \leq q < 2.0$ | 1.000 |
| 10 | $2.0 \leq q < 3.0$ | 1.000 |
| 11 | $3.0 \leq q < 4.0$ | 1.000 |
| 12 | $4.0 \leq q < 5.0$ | 1.125 |
| 13 | $5.0 \leq q < 6.0$ | 1.250 |
| 14 | $6.0 \leq q < 7.0$ | 1.500 |
| 15 | $7.0 \leq q < \infty$ | 2.000 |

FIG. 2F

| Index $c(n)$ | Quant. level $e(n)/\Delta(n)$ | Scale factor $a(c(n))$ |
|---|---|---|
| 0 | $-\infty \leq q < -3.0$ | 1.50 |
| 1 | $-3.0 \leq q < -2.0$ | 1.25 |
| 2 | $-2.0 \leq q < -1.0$ | 1.00 |
| 3 | $-1.0 \leq q < 0.0$ | 1.00 |
| 4 | $0.0 \leq q < 1.0$ | 1.00 |
| 5 | $1.0 \leq q < 2.0$ | 1.00 |
| 6 | $2.0 \leq q < 3.0$ | 1.25 |
| 7 | $3.0 \leq q < \infty$ | 1.50 |

| Index $c(n)$ | Quant. level $e(n)/\Delta(n)$ | Scale factor $\alpha(c(n))$ |
|---|---|---|
| 0 | $-\infty \leq q < -1$ | 1.1250 |
| 1 | $-1 \leq q < 0$ | 0.9375 |
| 2 | $0 \leq q < 1$ | 0.9375 |
| 3 | $1 \leq q < \infty$ | 1.1250 |

FIG. 3A

| Index $c(n)$ | Quant. level $e(n)/\Delta(n)$ | Scale factor $\alpha(c(n))$ |
|---|---|---|
| 0 | $-\infty \leq q < -0.5$ | 1.0625 |
| 1 | $-0.5 \leq q < 0.5$ | 0.9375 |
| 2 | $0.5 \leq q < \infty$ | 1.0625 |

FIG. 3D

| Index $c(n)$ | Quant. level $e(n)/\Delta(n)$ | Scale factor $\alpha(c(n))$ |
|---|---|---|
| 0 | $-\infty \leq q < -2.0$ | 1.1250 |
| 1 | $-2.0 \leq q < -1.0$ | 1.0000 |
| 2 | $-1.0 \leq q < 0.0$ | 0.9375 |
| 3 | $0.0 \leq q < 1.0$ | 0.9375 |
| 4 | $1.0 \leq q < 2.0$ | 1.0000 |
| 5 | $2.0 \leq q < \infty$ | 1.1250 |

FIG. 3C

| Index $c(n)$ | Quant. level $e(n)/\Delta(n)$ | Scale factor $\alpha(c(n))$ |
|---|---|---|
| 0 | $-\infty \leq q < -1.5$ | 1.0625 |
| 1 | $-1.5 \leq q < -0.5$ | 1.0000 |
| 2 | $-0.5 \leq q < 0.5$ | 0.9375 |
| 3 | $0.5 \leq q < 1.5$ | 1.0000 |
| 4 | $1.5 \leq q < \infty$ | 1.0625 |

| Index c(n) | Quant. level e(n) / Δ(n) | Scale factor α(c(n)) |
|---|---|---|
| 0 | -∞ ≤ q < -7.0 | 1.1250 |
| 1 | -7.0 ≤ q < -6.0 | 1.1250 |
| 2 | -6.0 ≤ q < -5.0 | 1.1250 |
| 3 | -5.0 ≤ q < -4.0 | 1.1250 |
| 4 | -4.0 ≤ q < -3.0 | 0.9375 |
| 5 | -3.0 ≤ q < -2.0 | 0.9375 |
| 6 | -2.0 ≤ q < -1.0 | 0.9375 |
| 7 | -1.0 ≤ q < 0.0 | 0.9375 |
| 8 | 0.0 ≤ q < 1.0 | 0.9375 |
| 9 | 1.0 ≤ q < 2.0 | 0.9375 |
| 10 | 2.0 ≤ q < 3.0 | 0.9375 |
| 11 | 3.0 ≤ q < 4.0 | 0.9375 |
| 12 | 4.0 ≤ q < 5.0 | 1.1250 |
| 13 | 5.0 ≤ q < 6.0 | 1.1250 |
| 14 | 6.0 ≤ q < 7.0 | 1.1250 |
| 15 | 7.0 ≤ q < ∞ | 1.1250 |

FIG. 3F

| Index c(n) | Quant. level e(n) / Δ(n) | Scale factor α(c(n)) |
|---|---|---|
| 0 | -∞ ≤ q < -3.0 | 1.1250 |
| 1 | -3.0 ≤ q < -2.0 | 1.1250 |
| 2 | -2.0 ≤ q < -1.0 | 0.9375 |
| 3 | -1.0 ≤ q < 0.0 | 0.9375 |
| 4 | 0.0 ≤ q < 1.0 | 0.9375 |
| 5 | 1.0 ≤ q < 2.0 | 0.9375 |
| 6 | 2.0 ≤ q < 3.0 | 1.1250 |
| 7 | 3.0 ≤ q < ∞ | 1.1250 |

FIG. 3E

SPEECH CODING SYSTEM

BACKGROUND OF THE INVENTION

The present invention relates to a speech coding system with a speech encoder and a speech decoder cooperating with said speech encoder, the speech encoder comprising a pre-processor and an ADPCM (adaptive differential pulse code modulation) encoder with a quantizer and step-size adaptation means and the speech decoder comprising an ADPCM decoder with similar step-size adaptation means as in the ADPCM encoder and with a decoder, and a post-processor, the quantizer being provided with storage means containing values for a correction factor $\alpha((c(n))$ of the step-size $\Delta(n)$, said correction factor being dependent on the quantizer output signal $c(n)$.

SUMMARY OF THE INVENTION

The speech encoder generates a bit-stream, which can be stored or transmitted through a channel. A poor storage device or a bad transmission channel might not be able to preserve this information; bit-errors in the form of bit changes may occur. Also, when voice signals are processed in the encoder of a standard P²CM audio coding system, i.e. a processed ADPCM encoder and -decoder, such bit-errors may occur. When the bit-error rate is higher than 1%, artifacts can be heard. Most of these artifacts are labeled as a sudden increase or decrease in volume. A close examination of the coder reveals that the most vulnery part of the coding system for bit-errors are the adaptive step-size $\Delta(n)$ means. The adaptation depends on the generated code levels. When these code levels change due to bit-errors, the step-size of the ADPCM encoder and the ADPCM decoder are no more the same. Therefore, it is already proposed to provide the quantizer with storage means containing values for a correction factor $\alpha t(c(n))$ of the step-size $\Delta(n)$. The step-size may then adapted according to, for example, the relation:

$$\Delta(n+1) = \begin{cases} [\Delta(n)+b] \cdot A \cdot \alpha(c(n)) & \text{if } [\Delta(n)+b] < \Delta_{max}, \text{ or} \\ [\Delta(n)+b] \cdot A & \text{otherwise} \end{cases} \quad (P)$$

with A a constant (A<1). The down scaled step-size $[\Delta(n)+b].A$ is scaled up by a factor $\alpha((c(n))$ (>1) if the maximum allowed step-size $\Delta_{max}$ is not exceeded. The choice of the correction factor value $\alpha(c(n))$ is such that a faster adaptation for codes belonging to higher quantization levels is made to allow the coding system to adapt faster when the level of the input signal suddenly increases. However, in case small energy changes at the input of the quantizer occur, the adaptation with the known correction tables for the correction factor $\alpha((c(n))$ is not sufficient.

The purpose of the invention is to provide for an improved step-size adaptation in the quantizer of a speech encoder and decoder.

Therefore, in accordance with the invention, the speech coding system as described in the opening paragraph is characterized in that the step-size adaptation occurs according to the relation:

$$\Delta(n+1) = \Delta(n) \cdot A \cdot \begin{cases} \alpha(c(n)) & \text{if } \alpha(c(n)) < 1 \\ \alpha(c(n))+b & \text{if } \Delta(n) \cdot A \cdot c_{max} < \Delta_{max} \\ 1 & \text{otherwise;} \end{cases} \quad (Q)$$

wherein b, A and $\Delta_{max}$ are constants.

Particularly when the pre-processor is provided with phase-smearing filter means and the post-processor is provided with filter means inverse thereto as described in ID604963, the energy of the input to the ADPCM encoder increases more gradually, allowing a better choice for ($\alpha(c(n))$). Therefore, the content of said patent application is considered to be part of the description of the present invention. Without such phase-smearing filter means problems may arise with pulse-like input signals occurring in close-microphone recording.

These and other aspects of the invention will be apparent from and elucidated with reference to the drawing and the embodiment described hereinafter. In the drawing:

FIGS. 2A–2F show prior art tables with the quantization and scale factors of a ADPCM coder; and FIGS. 3A–3F show tables with the quantization and scale factors for an ADPCM coder according to the invention with a phase-smearing filter in the pre-processor and an inverse phase-smearing filter in the post-processor.

Figure 1:
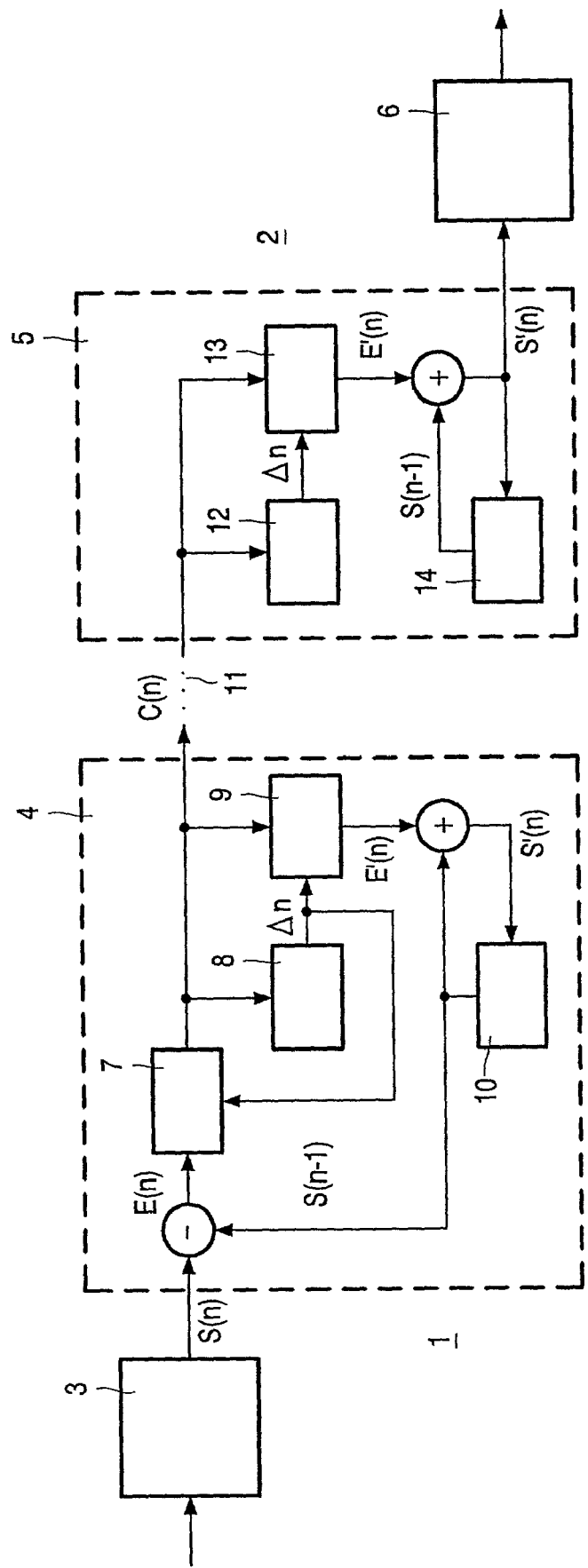
FIG. 1 shows a block diagram of a P²CM coding system according to the invention.

The P²CM audio coding system in FIG. 1 is constituted by an encoder 1 and a decoder 2. The encoder 1 comprises a pre-processor 3 and an ADPCM encoder 4, while the decoder 2 is provided with an ADPCM decoder 5 and a post-processor 6. The ADPCM encoder comprises a quantizer block 7, a step-size adaptation block 8, a decoder block 9 and a predictor block 10. The ADPCM decoder comprises a step-size adaptation block 12, a decoder block 13 and a predictor block 14. The pre-processor comprises a phase-smearing filter to smooth the effect of rapid high energy changes at the input of the quantizer and spectral amplitude warping means to modify the signal spectrum prior to encoding, while the post-processor comprises means to undo the effect of warping in the pre-processor and an inverse filter. In a preferred embodiment phase-smearing filtering and warping as well as inverse filtering and unwarping are realized in the frequency domain. Therefore, both pre- and post-processor are provided with means, e.g. a FFT unit, to transform time domain audio signals to the frequency domain, and means, e.g. an Inverse FFT, to transform the signals processed for filtering and warping or inverse filtering and unwarping respectively from the frequency domain to the time domain. As described in ID604963, in a specific embodiment the phase-smearing filter has a substantially linear increasing frequency characteristic between 0 and the nyquist-frequency and a constant amplitude characteristic.

The input for the ADPCM encoder 4 is a sampled audio signal provided by the pre-processor 3. When a sample n has a value s(n), for every input value s(n) the difference between this value and the estimated (predicted) value s(n−1) is taken as an error signal e(n) which is then quantized and encoded by the quantizer block 7, giving the output code c(n). The output code c(n) forms a bitstream which is sent or transmitted and received by the ADPCM decoder 5. In FIG. 1 this is indicated by the broken line 11. The output code c(n) is also used for the adaptation of the quantizer step-size Δn by block 8 and by the decoder block 9 to get a quantized error signal e'(n). The quantized error signal e'(n) is added to the predicted value s(n−1) resulting in the quantized input value s'(n). This value s'(n) is used by the predictor block 10 to adapt its prediction coefficients. The ADPCM decoder 5 is just a sub-set of the encoder 4; it reads the received quantized code c(n) from the bitstream and uses the same as the encoder 4 to update its internal variables. The output of the decoder block 13 is the quantized error signal e'(n), which, after being added to the predicted value s(n−1), gives the quantized audio signal s(n). The latter signal forms the input signal of the post-processor 6. The pre-and post-processor as well as the ADPCM encoder and decoder are described in ID604963, which, as already mentioned forms part of the present patent application.

A further input signal for the ADPCM encoder 4 is formed by a codec mode signal, which is sent or transmitted with the code words to the ADPCM decoder 5. This codec mode signal determines the bit allocation for the code words in the bitstream output of the ADPCM encoder 4 and the ADPCM decoder 5. Depending on the chosen codec mode, the resulting bitstream has a bit-rate of e.g. 12.8, 16, 19.2, 21.6, 24 or 32 kbits/s.

In the quantizer the following computations are made:

First a quantization is done in accordance with the relation:

$$q(n) = \lfloor e(n)/\Delta(n) + 0.5 \cdot c_{max} + 0.5 \rfloor,$$

where $\lfloor \ldots \rfloor$ represents a truncation operation.

The quantized signal q(n) is limited between 0 and $c_{max}$, this means that: $c(n) = \max[0, \min\{c_{max}, q(n)\}]$. The value of $c_{max}$ is dependent on the codec mode and thus on the bit-rate. For example, with the above bit-rates, $c_{max}$ may be successively 2, 3, 4, 5, 7 and 15. Then, the new step-size is computed in accordance with the relation:

$$\Delta(n+1) = \Delta(n) \cdot A \cdot \begin{cases} \alpha(c(n)) & \text{if } \alpha(c(n)) < 1 \\ \alpha(c(n)) + b & \text{if } \Delta(n) \cdot A \cdot c_{max} < \Delta_{max} \\ 1 & \text{otherwise;} \end{cases} \quad (Q)$$

wherein, in a particular embodiment, b, A and $\Delta_{max}$ are set to respectively 16, 0.996 and 8192. Furthermore the quantizer block is provided with storage means, which contains tables for α(c(n)) in dependency on c(n). Particularly in an embodiment where phase-smearing is applied these correction factors allow a more gradual adaptation of the step-size Δ(n) for all codes, resulting in an improved bit-error tolerance. Especially the high bit-rate modes benefit from this. The bit-error tolerance can be controlled by the parameter A; a value of 0.75 appeared to be a good compromise between robustness for bit-errors and overall speech quality, when the bit-error rate becomes higher than 1%.

In the prior art step-size adaptation according to formula (P) mentioned in the introductory part of the description, the values of α(c(n)) are given in the tables of FIGS. 2A–2F. Each of these tables give scale factors α(c(n)) in dependency on the index number of the quantizer output signal c(n) or the quantization level e(n)/Δn corresponding therewith. For these tables $c_{max}$ is respectively 2, 3, 4, 5, 7 and 15. Particularly from FIG. 2F, as being the longest table, it can be seen in combination with formula (P), that especially the higher codes result in a much faster adaptation of the step-size. Higher scale factors are important to allow the step-size faster when the level of the quantizer input signal suddenly increases. For the lower codes, α=1; in this case the step-size will gradually decrease. A faster step-size adaptation, however, implies a greater risk for bit-errors.

In the step-size adaptation according to formula, the values of α(c(n)) are given in the tables of FIGS. 3A–3F. Again, each of these tables give scale factors α(c(n)) in dependency on the index number of the quantizer output signal c(n) or the quantization level e(n)/Δn corresponding therewith. Also for these tables $c_{max}$ is respectively 2, 3, 4, 5, 7 and 15. The choice of the scale factors according to the tables of FIGS. 3A–3F is possible in cases where rapid high energy changes at the quantizer input do not occur. This is possible for long-distance recording, where the sound of a voice is smeared by reverberations in the room where the recording has been taken place or for coding systems with a phase-smearing filter as described in ID 604963. The scale factors in FIGS. 3A–3F provide for a more slow step-size adaptation, but, with the favorable consequence that the risk for bit-errors is diminished.

The embodiment described above is realized by an algorithm which may be in the form of a computer program capable of running on signal processing means in a P²CM audio encoder and decoder. In so far parts of the figures show units to perform certain programmable functions, these units must be considered as subparts of the computer program.

The invention described is not restricted to the described embodiments. Modifications thereon are possible. Particularly it may be noticed that the values and tables mentioned in the described embodiments and shown in the figures are only given as an example; other values and tables are possible.

What is claimed is:

1. Speech coding system with a speech encoder and a speech decoder cooperating with said speech encoder, the speech encoder comprising a pre-processor and an adaptive differential pulse code modulation (ADPCM) encoder with a quantizer and step-size adaptation means and the speech decoder comprising an ADPCM decoder with similar step-size adaptation means as in the ADPCM encoder and with a decoder, and a post-processor, the quantizer being provided with storage means containing values for a correction factor α(c(n)) of the step-size Δ(n), said correction factor being dependent on the quantizer output signal c(n), characterized in that the step-size adaptation occurs in accordance with the relation:

$$\Delta(n+1) = \Delta(n) \cdot A \cdot \begin{cases} \alpha(c(n)) & \text{if } \alpha(c(n)) < 1 \\ \alpha(c(n)) + b & \text{if } \Delta(n) \cdot A \cdot c_{max} < \Delta_{max} \\ 1 & \text{otherwise} \end{cases}$$

wherein α is a function of c(n), c(n) has a maximum value of $c_{max}$, and b, A and $\Delta_{max}$ are constants.

2. Speech coding system according to claim 1, characterized in that the storage means in the quantizer contain values of correction factors α(c(n)) in accordance with the tables FIGS. 3A–3F.

3. Speech coding system according to claim 1, characterized in that the correction factors α(c(n)) are adapted for a coding system, wherein in the pre-processor phase-smearing filter means are applied and in the post-processor inverse phase-smearing filter means are applied within the speech decoder.

* * * * *